(12) United States Patent
Weston et al.

(10) Patent No.: US 11,049,123 B2
(45) Date of Patent: Jun. 29, 2021

(54) METHODS FOR SPATIALLY RELATIVE APPORTIONMENT OF GEOSPATIAL DATA IN DISTRIBUTED COMPUTING SYSTEMS, AND RELATED SYSTEMS AND APPARATUS

(71) Applicant: Fifth Third Bancorp, Cincinnati, OH (US)

(72) Inventors: Arthur Eladio Weston, Union, KY (US); Harish Nakra, Mason, OH (US); Ramakrishna C. Peddu, Cincinnati, OH (US); David Silas Jordan, Newport, KY (US); Brian Lee Robinson, Loveland, OH (US); Vinay Kumar Jha, Mason, OH (US)

(73) Assignee: Fifth Third Bancorp, Cincinnati, OH (US)

( * ) Notice: Subject to any disclaimer, the term of this patent is extended or adjusted under 35 U.S.C. 154(b) by 0 days.

(21) Appl. No.: 16/892,509

(22) Filed: Jun. 4, 2020

(65) Prior Publication Data
US 2020/0302458 A1   Sep. 24, 2020

Related U.S. Application Data

(63) Continuation of application No. 16/212,862, filed on Dec. 7, 2018.

(Continued)

(51) Int. Cl.
*G06Q 30/02* (2012.01)
*G06F 16/29* (2019.01)

(52) U.S. Cl.
CPC ......... *G06Q 30/0205* (2013.01); *G06F 16/29* (2019.01)

(58) Field of Classification Search
CPC ...................................... G06Q 30/02
See application file for complete search history.

(56) References Cited

U.S. PATENT DOCUMENTS

| 7,724,965 | B2 | 5/2010 | Aguera y Arcas |
| 7,937,286 | B2* | 5/2011 | Newman ............ G06Q 30/0203 |
| | | | 705/7.31 |

(Continued)

OTHER PUBLICATIONS

"Modelina spatial relationships," published at <https://pro.arcais.conn/en/Dro-aDP/tool-reference/spatial-statistics/modelina-spatial-relationships.htm> and archived in the Internet Archive on Nov. 18, 2017, 11 pp. (Year: 2017).*

(Continued)

*Primary Examiner* — Alan S Miller
*Assistant Examiner* — Jay-Ming Wang
(74) *Attorney, Agent, or Firm* — Goodwin Procter LLP

(57) ABSTRACT

A method and processing system for assessing of the health of a network of retail locations in a defined geographic area, by a process including the development of a greenfield benchmark score for a network of ideally sited locations, followed by the development of a brownfield score of current locations, for comparison to the greenfield score. The invention is further applicable to decisions to open a new location, relocate an existing location or close an existing location. In these cases, the effect of opening a new location, or relocating or closing an underperforming location is evaluated by recalculating the brownfield score after the addition of each of several potential new locations, and/or after relocating or closing each of several poorly performing locations.

27 Claims, 13 Drawing Sheets

Related U.S. Application Data

(60) Provisional application No. 62/595,913, filed on Dec. 7, 2017.

(56) References Cited

U.S. PATENT DOCUMENTS

| | | | |
|---|---|---|---|
| 8,156,028 B2 | 4/2012 | Bishop et al. | |
| 8,364,581 B2 | 1/2013 | Scharner et al. | |
| 8,781,955 B2 | 7/2014 | Scharner et al. | |
| 8,938,432 B2* | 1/2015 | Rossmark | G06Q 10/067 707/700 |
| 10,475,118 B2 | 11/2019 | Scharner et al. | |
| 2005/0035964 A1 | 2/2005 | Heenan | |
| 2007/0143345 A1* | 6/2007 | Jones | G06F 16/248 |
| 2009/0006156 A1* | 1/2009 | Hunt | G06Q 30/02 705/7.11 |
| 2013/0073336 A1* | 3/2013 | Heath | G06Q 30/02 705/7.29 |
| 2013/0073388 A1* | 3/2013 | Heath | G06Q 30/02 705/14.53 |
| 2013/0073400 A1* | 3/2013 | Heath | G06F 16/29 705/14.73 |
| 2014/0006129 A1* | 1/2014 | Heath | G06Q 30/0222 705/14.23 |
| 2015/0356088 A1* | 12/2015 | Berkhin | G06F 16/24578 707/748 |
| 2016/0154690 A1 | 6/2016 | Horrell et al. | |
| 2016/0253689 A1* | 9/2016 | Milton | G06Q 30/0205 705/7.34 |
| 2017/0308549 A1* | 10/2017 | Sims | G06Q 50/167 |
| 2018/0233028 A1* | 8/2018 | Rhoads | G06F 16/9537 |
| 2018/0246909 A1* | 8/2018 | Bell | G06F 16/282 |
| 2018/0247321 A1* | 8/2018 | Crabtree | G06Q 10/063 |

OTHER PUBLICATIONS

"Tessellation," published atwiki.gis.conn/wiki/index.php/Tessellation (Nov. 26, 2011), 6 pages (Year: 2011).*

Dasgupta, S., Environmental Review: A comprehensive review of existing classification systems of brownfield sites. Environmental Practice, 11(4), 285-300. doi:http://dx.doi.org, (2009) (Year: 2009).*

Mulrooney et al., "A comparison of raster-based travel time surfaces against vector-based network calculations as applied in the study of rural food deserts," Applied Geography (Nov. 14, 2016), pp. 12-21 (Year: 2016).*

Russell, B., Making, Re-making, Managing and Controlling Customer Service Agents: Brownfield and Greenfield Call Centre Sites. Research and Practice in Human Resource Management, 10(1), (2002) (Year: 2002).*

S. Shekhar, P. R. Schrater, R. R. Vatsavai, Weili Wu and S. Chawla, "Spatial contextual classification and prediction models for mining geospatial data," in IEEE Transactions on Multimedia, vol. 4, No. 2, pp. 174-188, Jun. 2002, doi: 10.1109/TMM.2002.1017732. (Year: 2002).*

U.S. Appl. No. 16/212,862, filed Dec. 7, 2018, Weston et al.

"Modeling spatial relationships," published at <https://pro.arcois.com/en/pro-app/tool-reference/spatial-statistics/modeling-spatial-relationships.htm> and archived in the Internet Archive on Nov. 18, 2017, 11 pages.

"Tessellation," published at wiki.gis.com/wiki/index.php/Tessellation (Nov. 26, 2011), 6 pages.

Dasgupta, S., Environmental Review: a comprehensive review of existing classification systems of brownfield sites. Environmental Practice, 11(4), 285-300. doi:http://dx.doi.org, (2009).

Mulrooney et al., "A comparison of raster-based travel time surfaces against vector-based network calculations as applied in the study of rural food deserts," Applied Geography (Nov. 14, 2016), pp. 12-21.

Russell, B., Making, Re-making, Managing and Controlling Customer Service Agents: Brownfield and Greenfield Call Centre Sites. Research and Practice in Human Resource Management, 10(1), (2002).

Lange, J., "Creating thematic maps with hexagons in ArcGIS online", https://www.esri.com/arcgis-blog/products/analytics/analytics/creating-thematic-maps-with-hexagons-in-arcgis-online, (Aug. 26, 2015), 7 pages.

* cited by examiner

METHODS FOR SPATIALLY RELATIVE APPORTIONMENT OF GEOSPATIAL DATA IN DISTRIBUTED COMPUTING SYSTEMS, AND RELATED SYSTEMS AND APPARATUS

CROSS REFERENCE TO RELATED APPLICATIONS

This application is a continuation of and claims priority to U.S. patent application Ser. No. 16/212,862, titled "GEOSPATIAL MARKET ANALYTICS" and filed on Dec. 7, 2018, which claims priority and benefit of U.S. Provisional Application Ser. No. 62/595,913, titled "GEOSPATIAL MARKET ANALYTICS" and filed on Dec. 7, 2017, each of which is incorporated by reference herein in its entirety.

FIELD OF THE INVENTION

The present invention relates to methods and systems for geospatial market analytics, and specifically the use of geospatial analytics for the purpose of siting retail locations and other geographic decisions.

BACKGROUND OF THE INVENTION

Geospatial analysis has been known in the art. Methods have been proposed for associating relevant marketing data to a geographical map for the purposes of evaluating market strength in a particular area. This type of analysis is typically performed as part of the siting of a retail location.

One proposal for a detailed geospatial analysis is described in US Patent Publication 2015/0073954, which explains a manner in which data from a financial institution is geographically mapped to build a geospatial database. The data used may be credit card or debit card transaction data associated with particular residential addresses. The published method performs several heuristic processes to clean the data and associate the data to particular geographic areas, as well as anonymizing the data to safeguard the privacy of individual card and account holders. The data is used by business clients for the purposes of evaluating decisions as to whether to make promotions, investments and other transactions in particular geographic areas.

A challenge with these known systems is that the geographic granularity is not sufficient to enable decision making at the accuracy that can be needed for some applications. This is a consequence of the fact that the raw data which can feed into a geospatial database is often provided at a low level of granularity. As one instance some demographic data is provided on a ZIP code basis; in some urban areas a ZIP code region can be rather small, but in rural areas one ZIP code can span hundreds of square miles, thus limiting the granularity of data in such areas.

It is an object of the present invention to improve the granularity of a geospatial database to then allow much more particularized decisionmaking than has previously been the case, for example to provide decisionmaking on geographic areas of a well under one square mile. This permits "street-corner" decisionmaking and allows the relative grading of two locations which in prior systems would have been in a common region and indistinguishable from one another.

It is a further object of the invention to enhance the use of a geospatial database, particularly one with the noted enhanced detail, to permit additional improvements in the management and decisionmaking of a retail or other consumer facing business.

SUMMARY OF THE INVENTION

The present invention generates a geospatial database at a high level of granularity via several algorithms for allocating geospatial data to smaller geographic areas than those provided by the raw data.

The present invention further provides a method for assessment of the health of a network of retail locations in a defined geographic area, by a process including the development of a greenfield benchmark score for a network of ideally sited locations, followed by the development of a brownfield score of current locations, for comparison to the greenfield score. In some embodiments the comparison is expressed as a percentage ratio of the brownfield score to the greenfield score. In detailed embodiments the greenfield score is formed by siting a first retail location at the highest scoring location in an area, degrading the scores of surrounding areas to reflect the presence of the first retail location, then repeating these steps until a designated number of retail sites are chosen. A brownfield score is formed by identifying the highest scoring existing location and including it as the first location in the brownfield score, then degrading the scores of surrounding areas to reflect the presence of the first location, and the identifying the next highest scoring location and including it as the second location in the brownfield score, and repeating these steps until all of the existing locations are included in the brownfield score. A comparison of the thus-developed greenfield and brownfield scores provides a robust assessment of a network's health.

In another aspect the invention is applicable to decisions to open a new location, relocate an existing location or close an existing location. In these cases, the effect of opening a new location, or relocating or closing an underperforming location is evaluated by recalculating the brownfield score after the addition of each of several potential new locations, and/or after relocating or closing each of several poorly performing locations. In specific embodiments of this aspect, customer activity data is used to identify locations which are used by common customers and evaluate the network effect of closing one of those locations upon the customers who use both locations. In further embodiments, customer activity data is used to identify locations that are used by numerous common customers with multiple other locations, which are known as "hub" locations, and to respond by expanding access to services at a "hub" location such as by changing hours of business or locating specialized talent or resources at that location. In still further embodiments customer activity data is used to identify healthy locations which do not have common customers with other locations, as targets for potential divestiture rather than closure.

In additional aspects the invention is applicable to evaluating potential retail partners by assessing the retail locations of potential partners according to a brownfield scoring analysis that includes existing retail locations, to determine which of several potential partners provides the greatest value of new retail locations.

In still further aspects the invention is applicable to evaluating potential merger or acquisition targets, by assessing the retail locations of potentially merged entities according to a brownfield scoring analysis that includes existing locations of both potentially merged entities.

The above and other objects and advantages of the present invention shall be made apparent from the accompanying drawings and the description thereof.

DETAILED DESCRIPTION OF THE INVENTION

Figure 1:
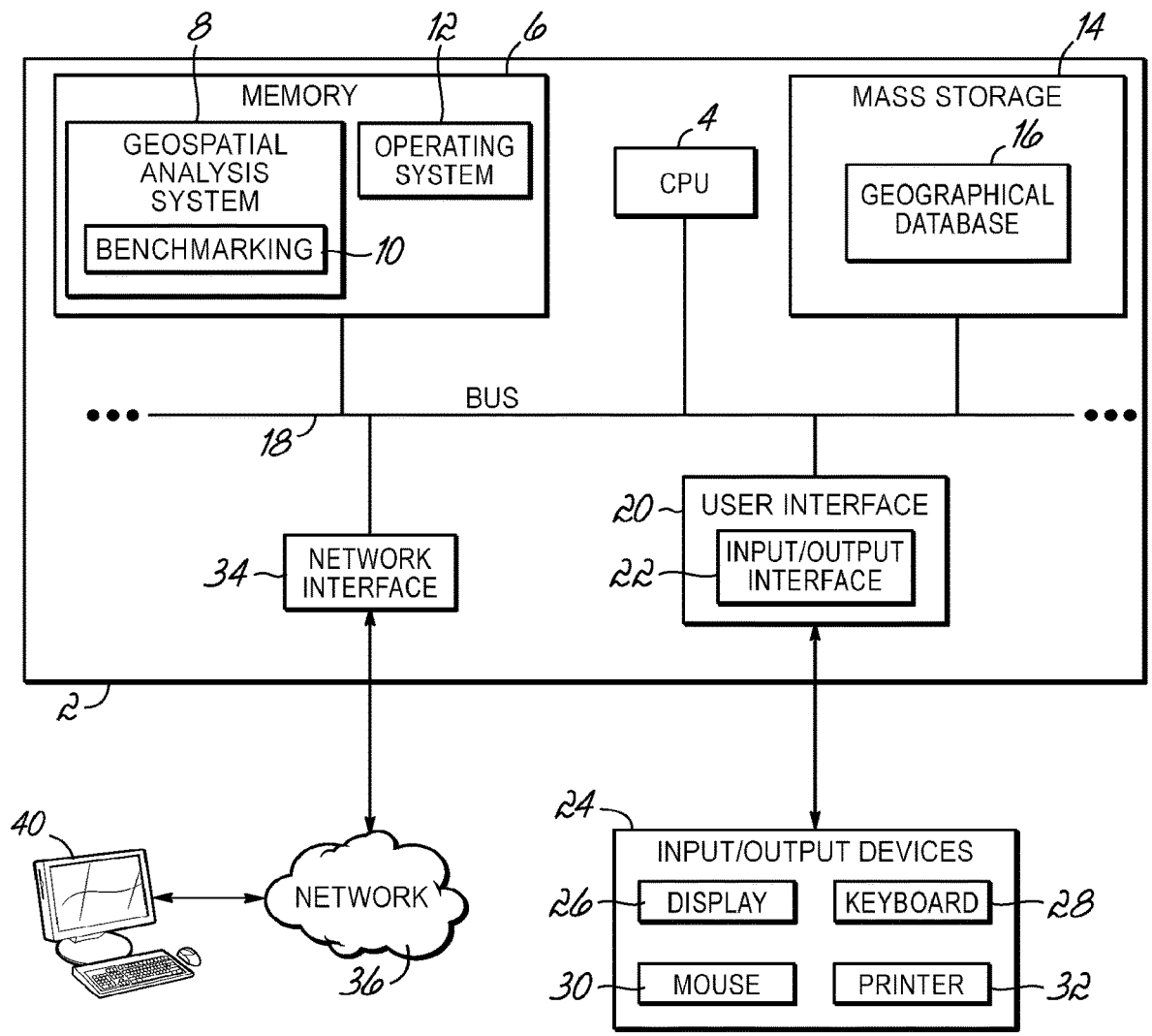
FIG. 1 is a block diagram of a computer system for performing a geographic analysis consistent with the invention.

Turning now to the Drawings, wherein like numbers denote like parts throughout the several views, FIG. 1 illustrates an exemplary hardware and software environment for a processing apparatus 2 consistent with the invention. For the purposes of the invention, processing apparatus 2 (or "processor") may represent practically any type of computer, computer system or other programmable electronic device, including a client computer, a server computer, a personal computer, a portable computer, a handheld computer, an embedded controller, etc. Moreover, processor 2 may be implemented using one or more networked computers, e.g., in a cluster or other distributed computing system. Processor 2 may be capable of functioning as a client and/or server in a client-server environment. Moreover, processor 2 may be capable of functioning as a client and/or server in a peer-to-peer environment. Multiple processors 2 may be interfaced in a client-server environment and/or peer-to peer environment. Processor 2 will hereinafter also be referred to as a "computer," although it should be appreciated that the term "processor" may also include other suitable programmable electronic devices consistent with the invention.

Computer 2 typically includes a central processing unit (CPU) 4 including one or more microprocessors coupled to a memory 6, which may represent the random access memory (RAM) devices comprising the main storage of computer 2, as well as any supplemental levels of memory, e.g., cache memories, non-volatile or backup memories (e.g., programmable or flash memories, solid state or disk memory), read-only memories, etc. In addition, memory 6 may be considered to include memory storage physically located elsewhere in computer 2, e.g., any cache memory in a processor in CPU 4, as well as any storage capacity used as a virtual memory, e.g., as stored on a mass storage device 14 or on another computer coupled to computer 2.

Computer 2 also typically receives a number of inputs and outputs for communicating information externally. For interface with a user or operator, computer 2 typically includes a user interface 20 and/or an input/output interface 22 incorporating one or more user input/output devices 24 (e.g., a keyboard 28, a mouse 30, a printer 32, a trackball, a joystick, a touchpad, and/or a microphone, among others) and a display 26 (e.g., a CRT monitor, an LCD display panel, and/or a speaker, among others). Otherwise, user input may be received via another computer or terminal, e.g., via a client or single-user computer 40 coupled to computer 2 over a network 36. This latter implementation may be desirable where computer 2 is implemented as a server or other form of multi-user computer. However, it should be appreciated that computer 2 may also be implemented as a standalone workstation, desktop, or other single-user computer in some embodiments.

For non-volatile storage, computer 2 typically includes one or more mass storage devices 14, e.g., a floppy or other removable disk drive, a hard disk drive, a direct access storage device (DASD), an optical drive (e.g., a CD drive, a DVD drive, etc.), and/or a tape drive, among others. Furthermore, computer 2 may also include an interface 34 with one or more networks 36 (e.g., a LAN, a WAN, a wireless network, and/or the Internet, among others) to permit the communication of information with other computers and electronic devices. It should be appreciated that computer 2 typically includes suitable analog and/or digital interfaces between CPU 4 and each of components 6, 14, 34, and 20 as is well known in the art (e.g., via bus 18).

Computer 2 operates under the control of an operating system 12, and executes or otherwise relies upon various computer software applications, components, programs, objects, modules, data structures, etc. Additionally, various applications, components, programs, object, modules, etc. may also execute on one or more processors in another computer coupled to computer 2 via a network, e.g., in a distributed or client-server computing environment, whereby the processing required to implement the functions of a computer program may be allocated to multiple computers over a network.

In particular, a Geospatial Analysis System 8 may be resident in memory 6 and used to access a Geographical Database 16 resident in mass storage 14. System 8 may be used to evaluate a geographical area and various geographical information to create a tessellation and hex pattern for the geographical area that reflects some or all of the available geographic information. Additionally, System 8 may be used by a user to evaluate geographic data in Database 16 as well as retrieve data from Database 16. Database 16 may also be accessible by the operating system 12.

The Geospatial Analysis System 8 may also have a Benchmarking application 10 associated with it, providing the user the ability to create benchmarking analysis of geographic area and retail locations placed therein, as described below.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2A:
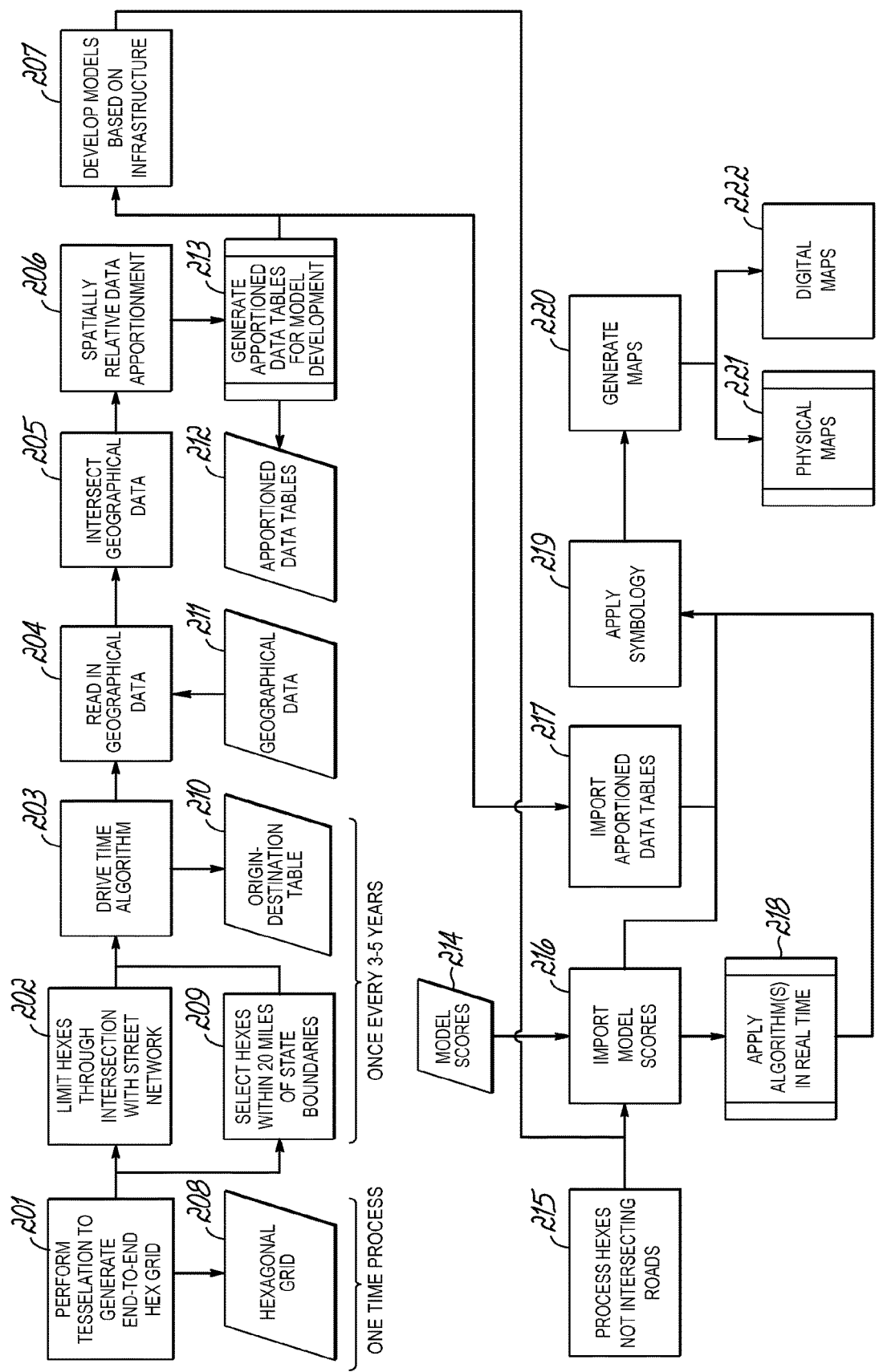
FIG. 2A is a flowchart illustrating the overall process implemented by the computer system of FIG. 1 to tessellate a geographic area into appropriate hexes for the purpose of geospatial market analysis in accordance with the present invention.

Referring now to FIG. 2A, a geospatial market analysis method performed by a processor such as discussed above, involves a series of geographic processing steps, some of which initialize the system for later analysis and are infrequently repeated, and some of which are repeated each time the system is used for a new analysis.

Figure 3A:
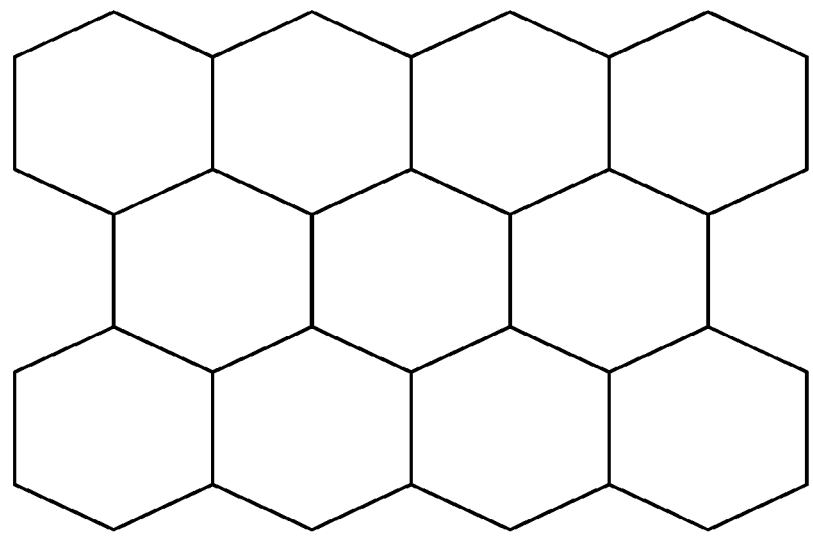
FIGS. 3A, 3B, 3C and 3D illustrate tessellation, formation of hexes identifiable by hex centroids, identification of hexes that intersect roads, and integration and apportionment of geographical data.
Figure 3B:
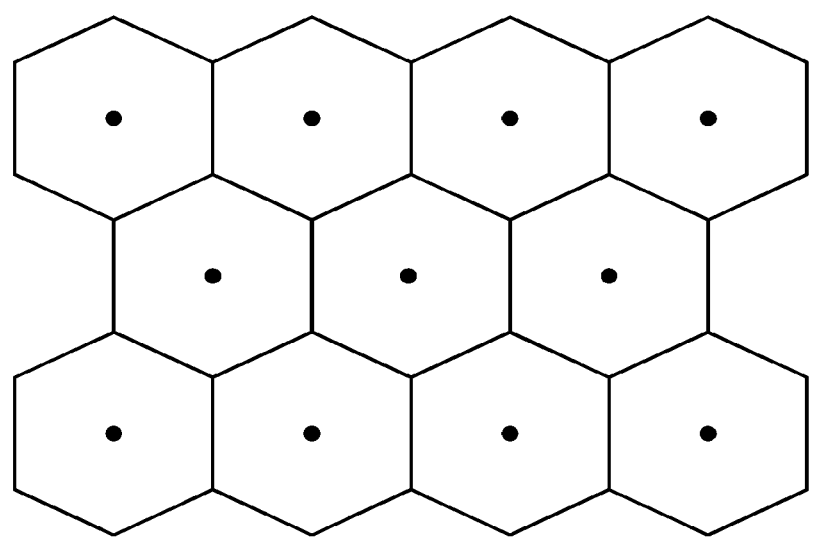

In a first step 201, the processor performs a tessellation of the entire geographic area of interest, to produce an end-to-end hex grid 208. The resulting grid of hexagonal areas or "hexes", illustrated in FIG. 3A, serves as a baseline for subsequent geographic functions. The grid of hexes is typically created only one time and used thereafter, and each is identified by a centroid point as shown in FIG. 3B.

Figure 2E:
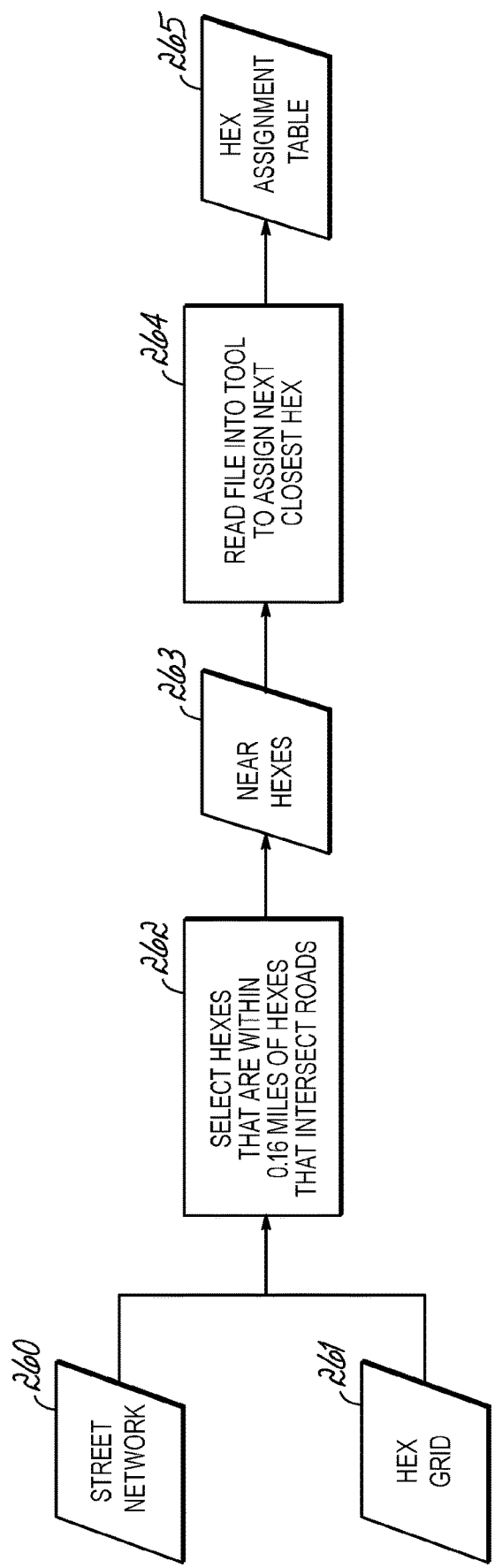
FIG. 2E is a flowchart illustrating the handling of hexes that do not intersect roads to identify nearby hexes applicable thereto.
Figure 3C:
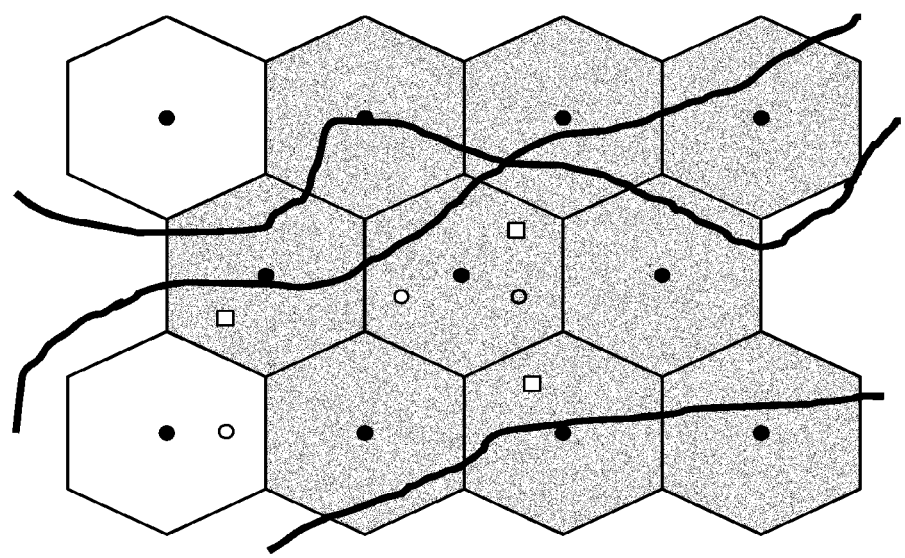

Next, the hexes created by the preceding step are analyzed in two ways to limit the number of hexes analyzed. First, in step 202, the processor overlays the street network for the area in interest on the hexes and selects those hexes which lie on (aka accessible via) the street network. The overlay of the street network is seen graphically in FIG. 3C, and hexes on the street network are shaded in FIG. 3C for illustration. As seen in FIG. 2E, this process involves the use of a street network database 260 and hex grid 261 for the region of interest, for example a grid of the continental United States. Those hexes are within 0.16 miles of hexes that intersect roads are included 262 in a group of "near hexes" 263, which are read and assigned 264 to their next closest hex for the sale of identifying those hexes deemed accessible in the output table 265.

In addition to the above processes, because state or other political boundaries tend to affect the street network, in step 209 those hexes within 20 miles of state boundaries are selected for further processing. The resulting hexes are then available for combination 204 with geographical data 211.

After the foregoing, a drive time algorithm 203 is applied to the selected hexes, to produce an origin-designation table 210 providing drive times from one hex to another, useful for subsequent processing. As seen in FIG. 2C, the drive time process is performed for those hexagons 240 that intersect the street network, which is known from available databases 242. The hex data and street network data are read 241, 243, and then an algorithm, of which there are several commercially available alternatives, is used to compute drive times between hexes using one of several rule sets 245 relating to assumed traffic conditions, driving times, and the like. The algorithm may operate from a rule set to compute drive times, including factors such as whether the adjacent streets are one way roads, public or private, the functional class of the roadway and the speed limit of the roadway. Other data such as historical traffic may also feed into drive time calculation rules. The resulting origin-destination table is the needed output for the following geographical analysis steps and is re-generated to accommodate for changes in the street network, or traffic patterns, as necessary. Typically, a regeneration will be required at least every three to five years to accommodate for street network changes.

Figure 2B:
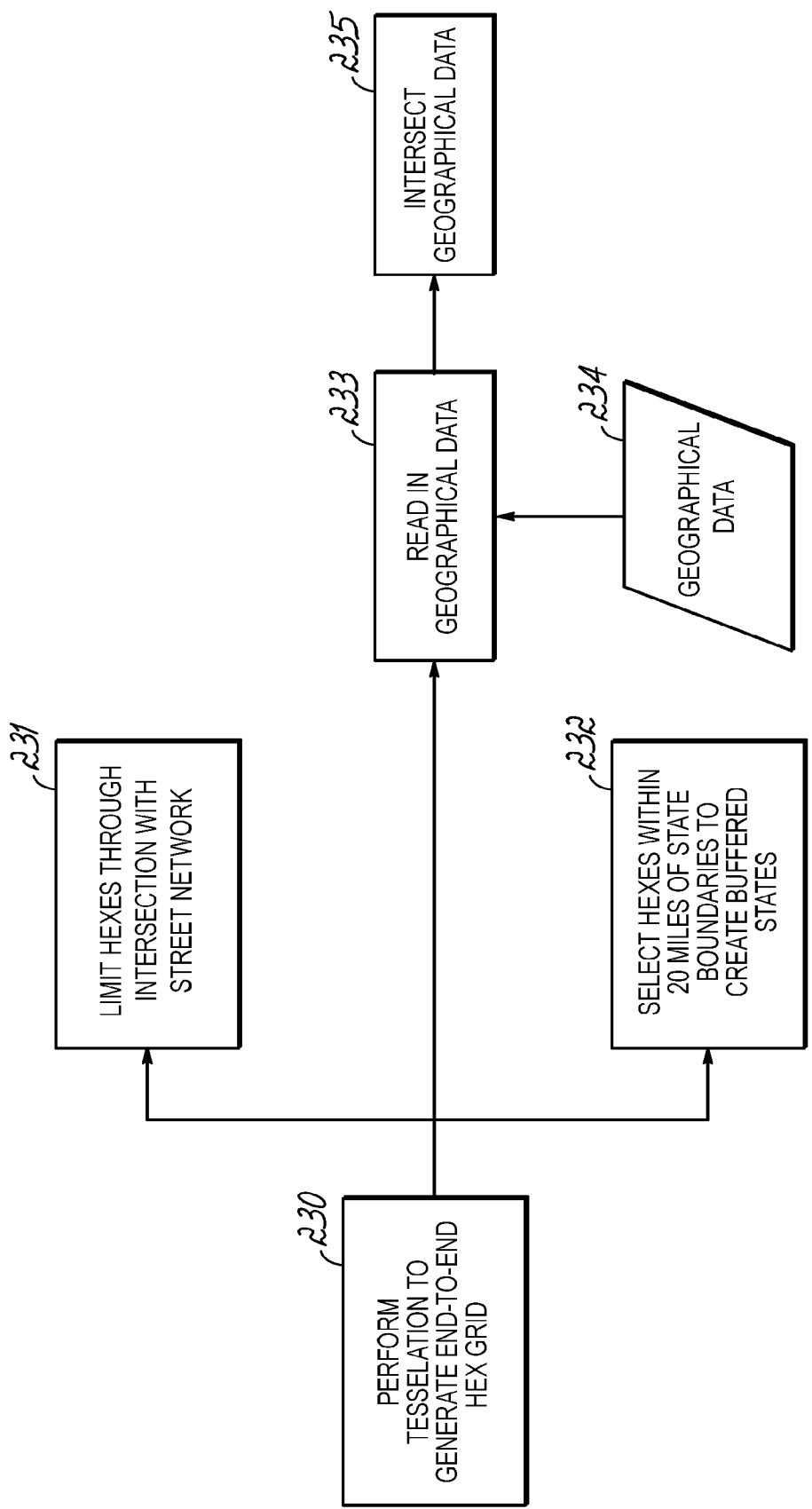
FIG. 2B is a flow chart for initializing a hex grid by a tessellation process, then limiting the hexes through intersection with street network and state boundary data.
Figure 2C:
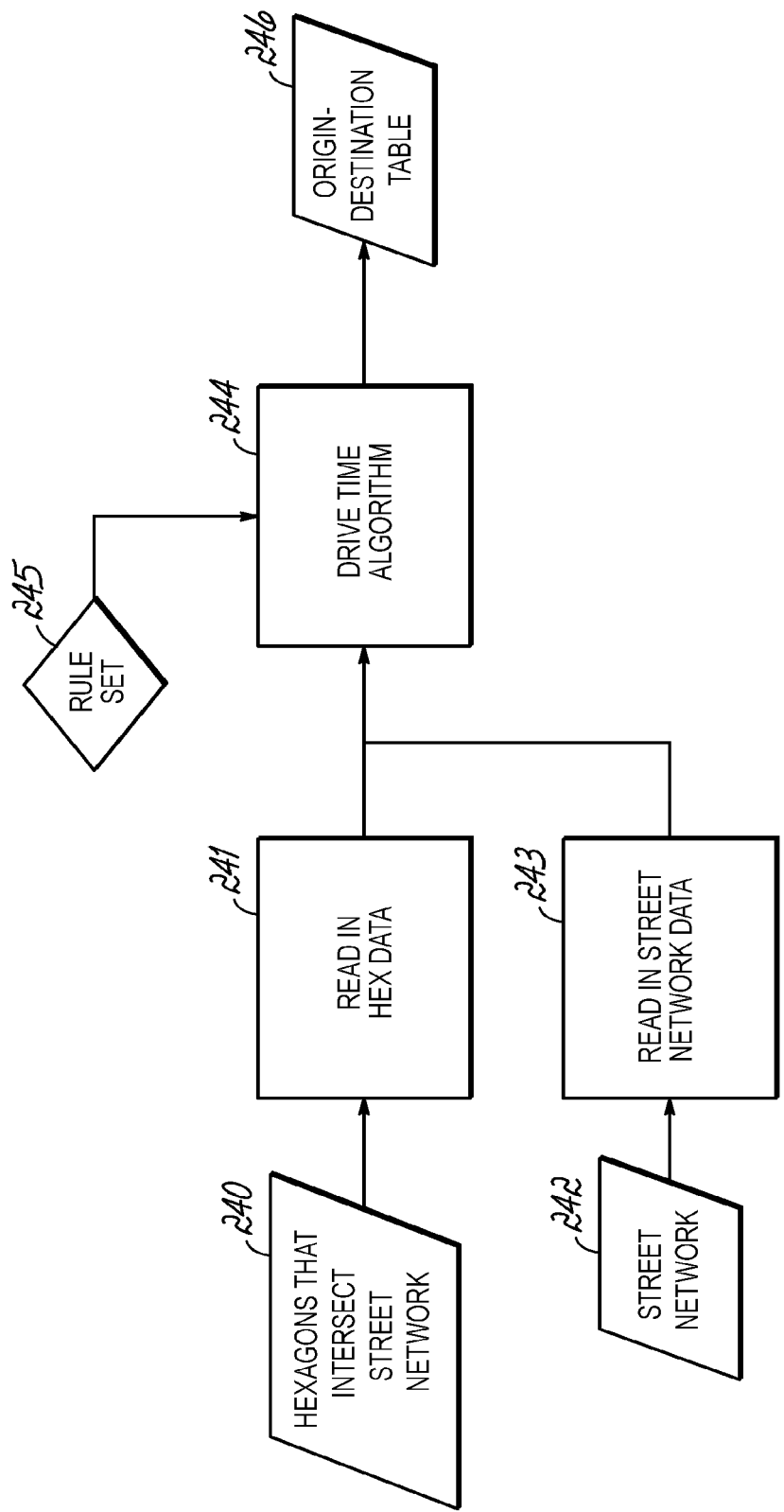
FIG. 2C is a flowchart illustrating the use of a drive time algorithm for generating an origin-destination table of drive times applicable to hexes which intersect the street network.

As seen in FIGS. 2A and 2B, the result of the tessellation 230 is delivered to three processes: first, a process 231 which identifies the hexes having intersection with the street network, a process 232 which selects hexes within 20 miles of state boundaries, and a process 233 which combines the hexes with geographical data. The intersection with geographical data involves apportionment of several types, as discussed herein.

Figure 2D:
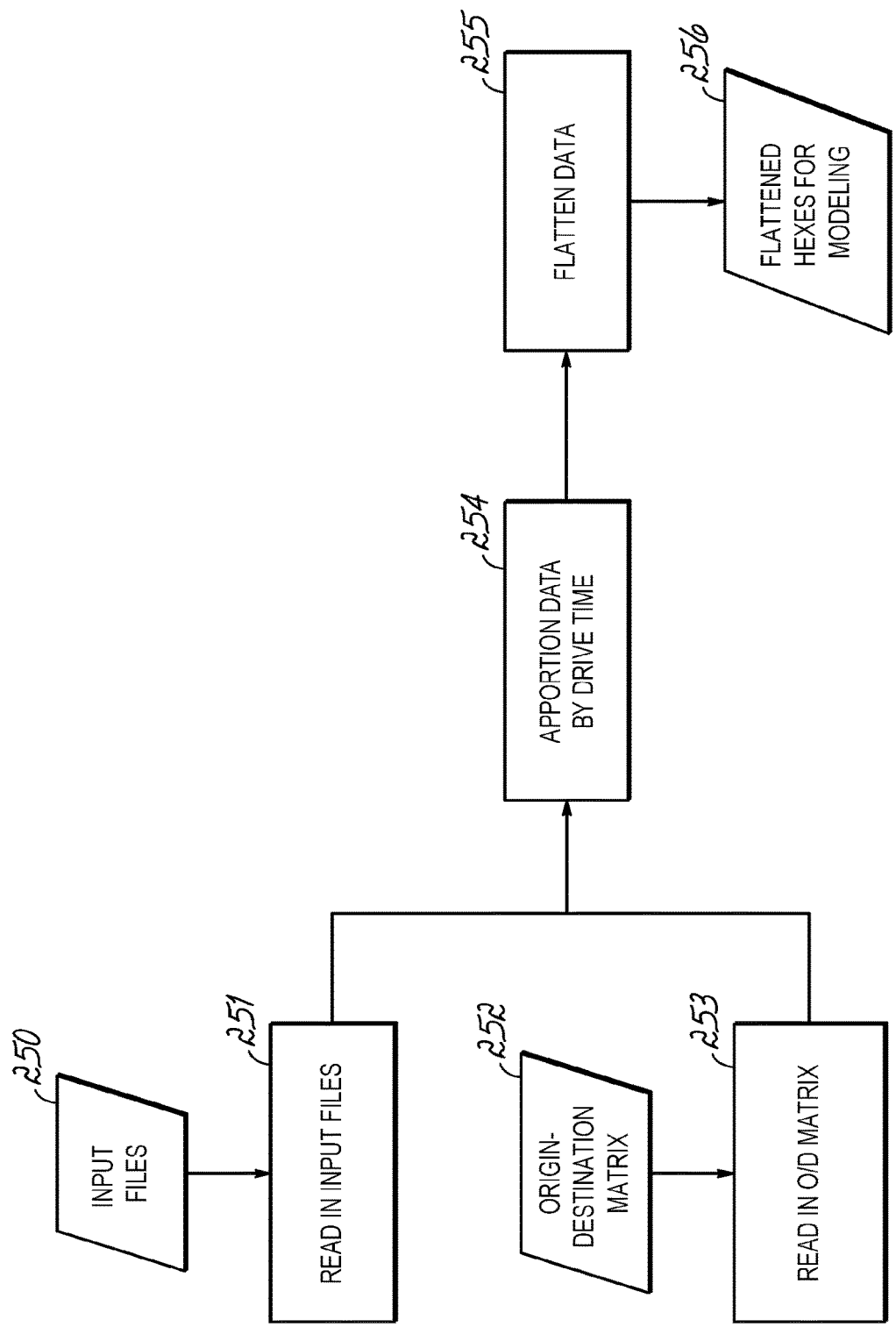
FIG. 2D is a flowchart illustrating the apportionment of data from geographic input files of spatially relative data to tessellated geographic areas through the use of drive time, to build flattened data for future modeling and evaluation.
Figure 3D:
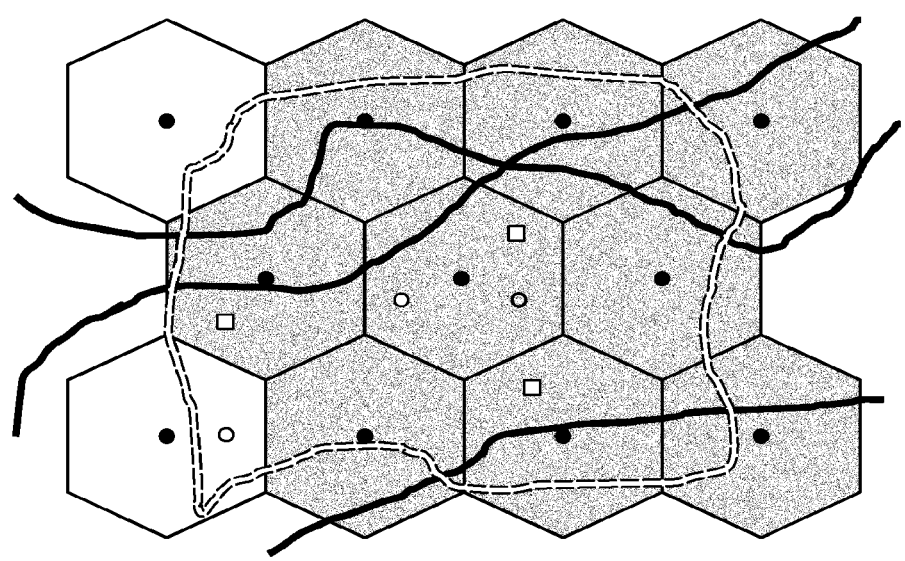

As seen in FIG. 2D, input files 250 containing geographic data, are read 251, and combined with the origin-destination matrix 252 produced in the preceding step, which is read 253 and supplied to an apportionment process 254 which utilizes drive times. In this manner, ZIP code data can be apportioned to all of the hexes bordering that ZIP in proportion to the relative drive time of each hex to the ZIP code. This is shown diagrammatically in FIG. 3D where data for a region (shown by a white outline) which applies to a group of locations is allocated to individual hexes, and at the same time data relating to points (squares, circles) lying within a single hex are allocated to that hex. Data on income, employment, credit ratings or any other factor which is indexed by household, or averages for a city, state, ZIP code, neighborhood or the like can be similarly apportioned. Each contributes to a scoring for a hex based upon the desireability of the apportioned data to the retail purpose. After the data is accumulated, the data is flattened 255 to a single score which is tabulated 256 and useable for analysis.

The market data can include numerous sources, such as financial activity data (credit or debit card transactions, loan activity, auto or home title transfers, and the like) or financial asset data (investment or banking account data). The data from larger regions is mapped into the smaller regions by attributing to each smaller region any data associated with locations within a given drive time of that region, using available road mapping databases and drive time algorithms, or by allocating more of the data to a region.

Returning to FIG. 2A, after geographic data is intersected 251 and apportioned 206, which results in apportioned data tables 212 via the described process 213, models based upon infrastructures attributes are developed 207, and used in connection with hexes 215 which do not intersect roads, to create scoring data which is combinable with the apportioned data tables 217. The infrastructure models approximate the accessibility of locations which are near to existing infrastructure even if not yet accessible by an intersection part of the road network.

Figure 2F:
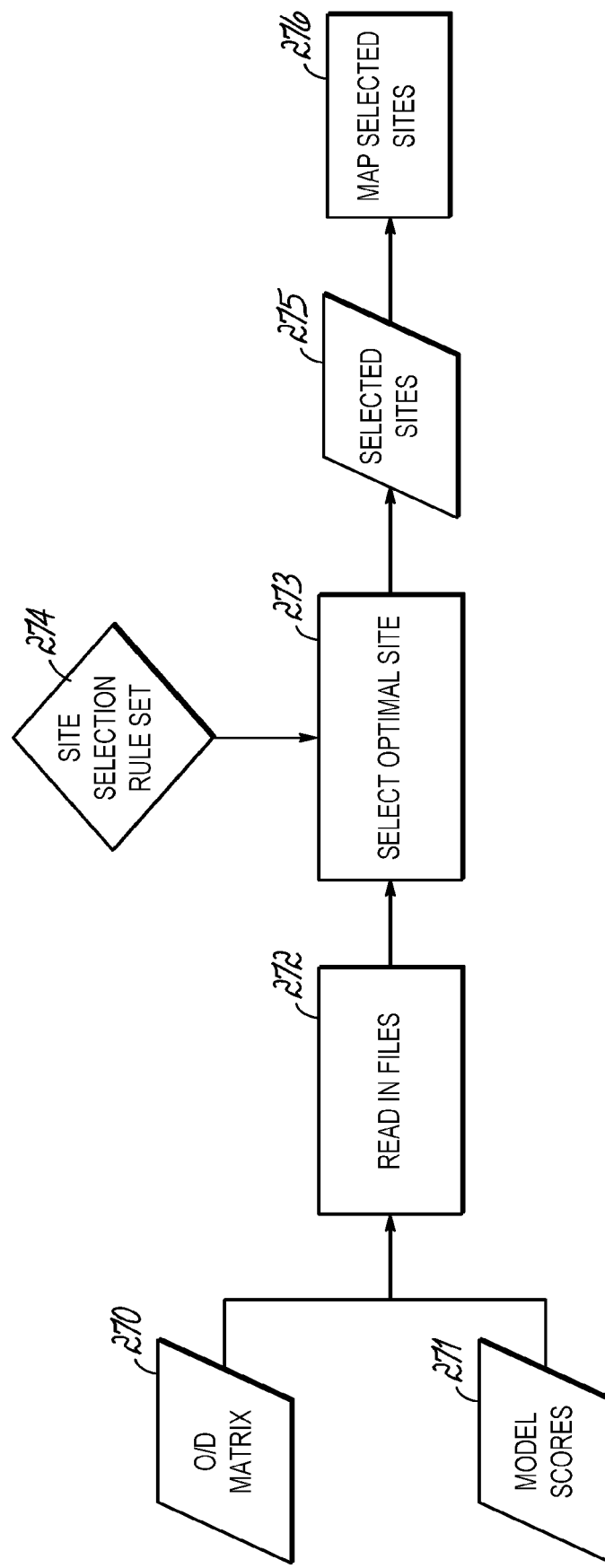
FIG. 2F is a flowchart generally illustrating a site selection process that proceeds from the generated data using a site selection rule set.

The resulting two sets of data, one for hexes intersecting roads and one for hexes near to roads, are imported 216 and combined with models for scoring locations 214, using real time algorithms 218 to create an overall scoring for every location in a geographic region. As seen in FIG. 2F, this process uses the origin-destination matrix 270 formed earlier and the model scores 271, which are read 272, and used with a site selection rule set 274 to select 273 an optimal site or combination of sites, as discussed below referencing FIG. 5. This produces a set of selected sites 275 which may be mapped 276. As seen in FIG. 2A, the scores are processed through a symbology metric 219, to create a mapping output 219 which may take the form of a physical printout 221 or a digital map 222 for display.

This part of the process of FIG. 2A operates in real time, allowing adjustment of the model scores 214 and re-evaluation of the hex databases in order to refine the scoring of locations based upon the relative importance of the various scoring factors involved in the scoring.

Figure 2G:
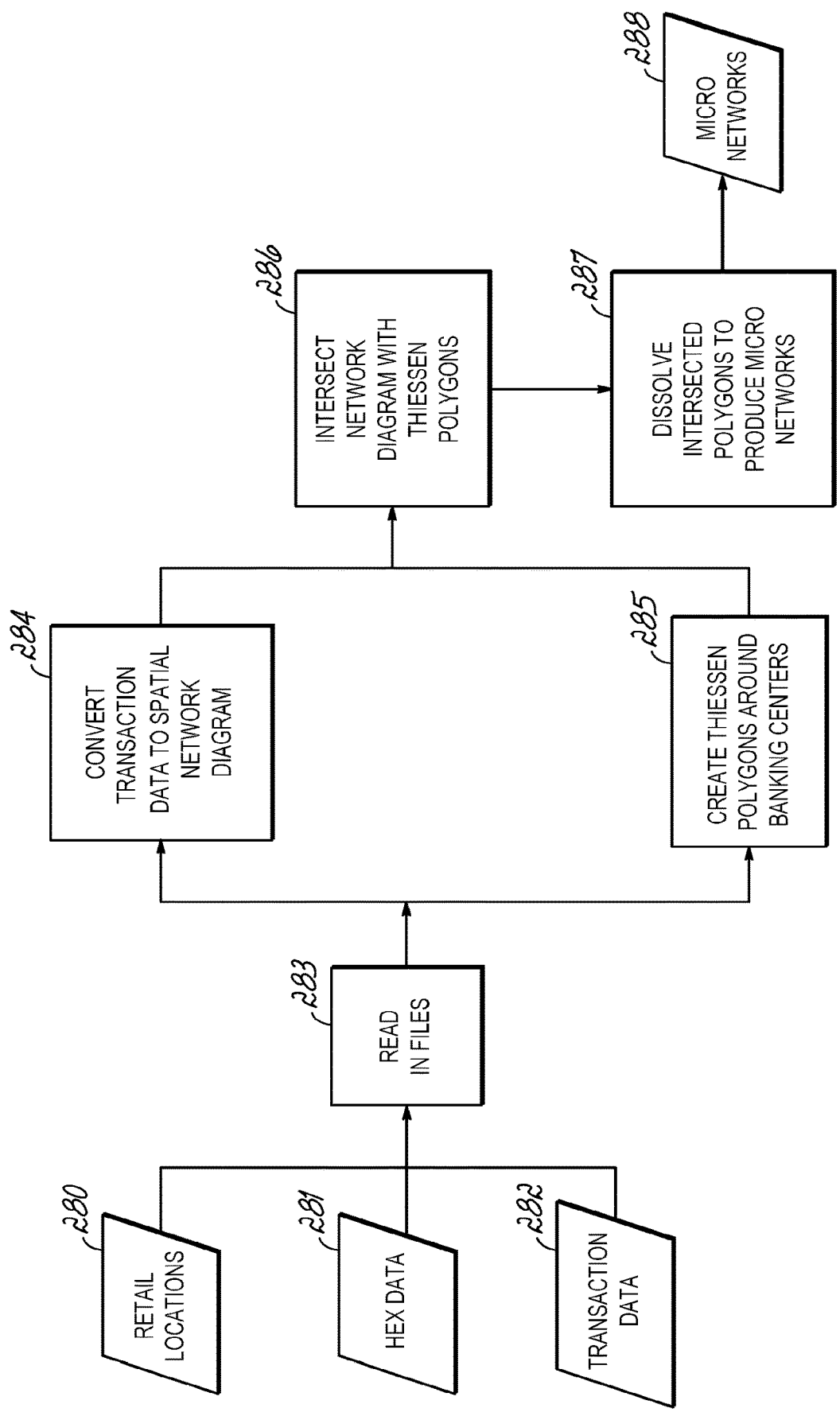
FIG. 2G is a flowchart illustrating a process for identifying micro networks from hex data, transaction data, and retail locations, for use in further processing and geospatial analysis.

Referring now to FIG. 2G, a process for identifying micro networks is described. In this process, retail locations 280 are combined with hex data 281 developed in accordance with the foregoing steps and matched with transaction data 282 from a common customer database, such as the registers of transactions at a consumer banking entity. These files are read collectively 283 and two parallel analyses are performed.

Figure 4A:
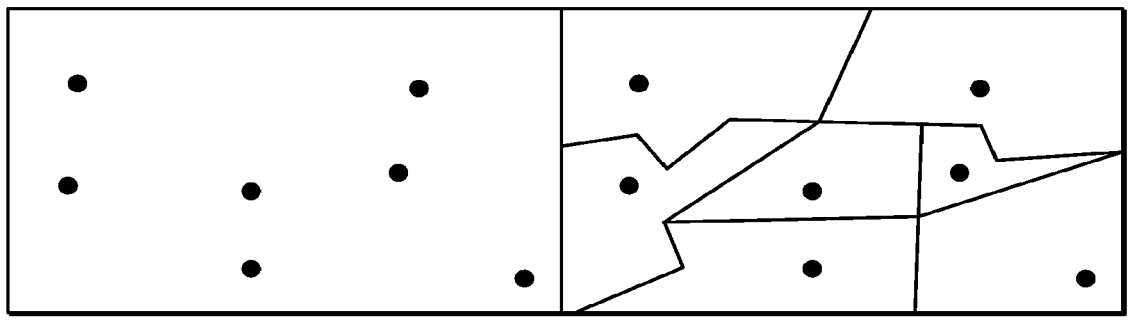
FIGS. 4A, 4B, 4C, 4D and 4E illustrate the creation of Thiessen/Voroni polygons around existing retail sites and the intersection of those polygons using micronetworks.

First, the geographic region populated by the existing retail locations (dots in FIG. 4A) is subdivided by generating 285 Thiessen polygons around each location (polygons in the right on FIG. 4A). This known process involves taking the intersection of polygons created by perpendicular bisectors of line segments connecting each location to its neighbors. The resulting polygons seen in FIG. 4A each represent one retail locations location geographic share of the entire region of interest.

Figure 4B:
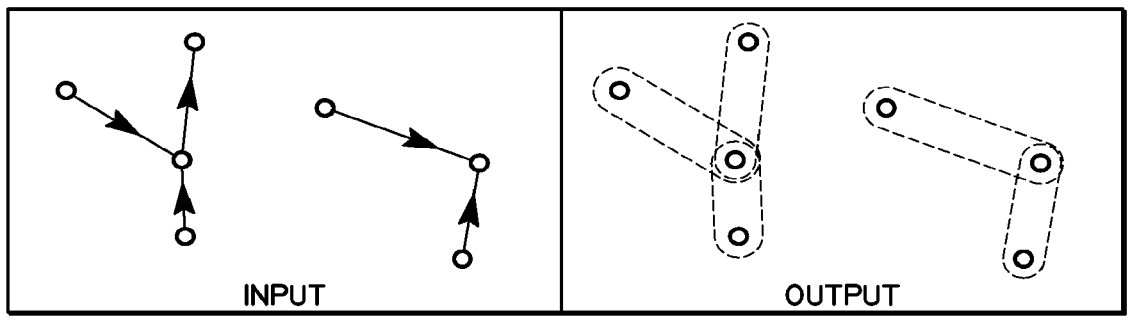
Figure 4C:
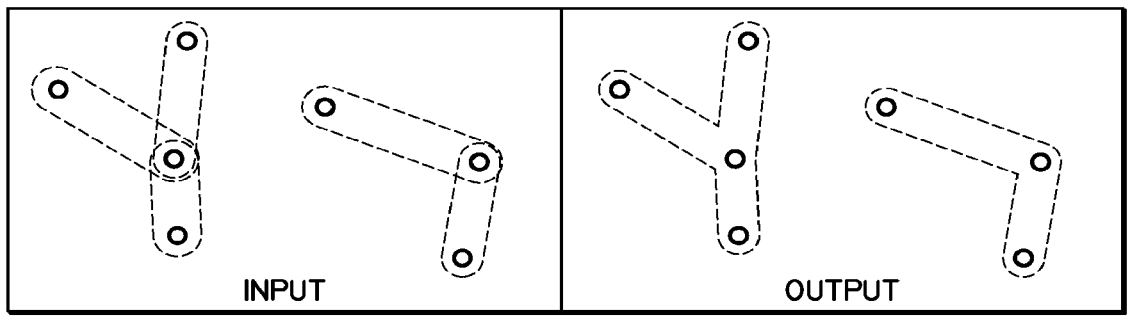

Second, the transaction data is converted 284 to a spatial network diagram, such as those shown in FIGS. 4B and 4C. As seen in FIG. 4B, a geographic area is captured, based on a path (left side of FIG. 4B) between each pair of retail locations that are associated or correlated to each other in the transaction data via common customer activity. The geographic area is defined as the path surrounded with a buffer region of, e.g., 2 meters, to create a geographic representation of each connection (right side of FIG. 4B). Next, as seen in FIG. 4C, the overlapping geographic representations (left side of FIG. 4B) are merged to create a geographic feature (right side of FIG. 4C) representing the geographic span of an economically connected set of retail locations.

Figure 4D:
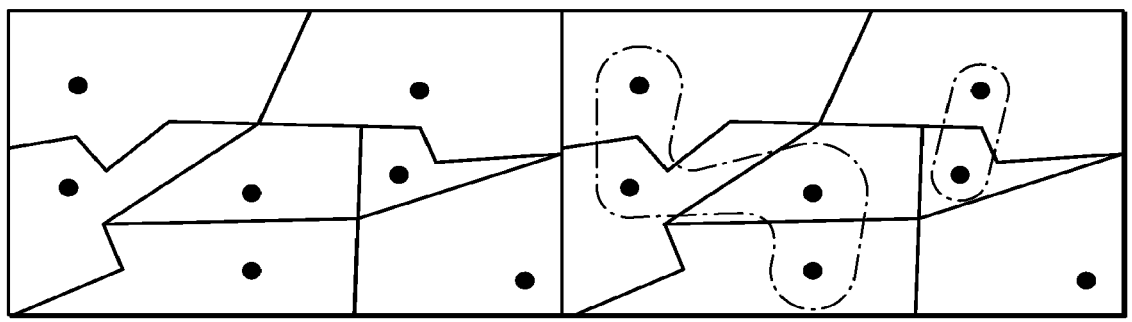
Figure 4E:
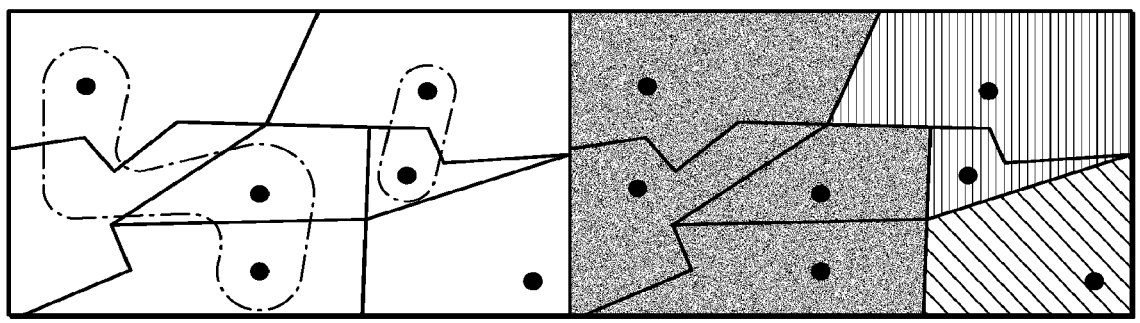

After the preceding steps, the processor intersects the network diagram from FIG. 4C with the Thiessen polygons of FIG. 4A, to overlap each as seen in the right side of FIG. 4D, and next, as seen in the right side of FIG. 4E, the processor dissolves the intersecting polygons to produce combined polygons representing micronetworks of retail locations which are physically adjacent and economically coupled, which are known herein as micronetworks.

The appendix attached to U.S. Provisional Patent Application 62/595,913, filed Dec. 7, 2017, describes the use of commercial software from Environmental Systems Research Institute, Inc. of 380 New York Street, Redlands, Calif. 92373-8100, United States, for implementing the herein-described algorithm used for populating a geospatial database with information at a high level of granularity for the purposes of performing analyses according to the present invention. Additional algorithms for developing a geospatial database are presented in the above-referenced US Patent Publication 2015/0073954.

Figure 5:
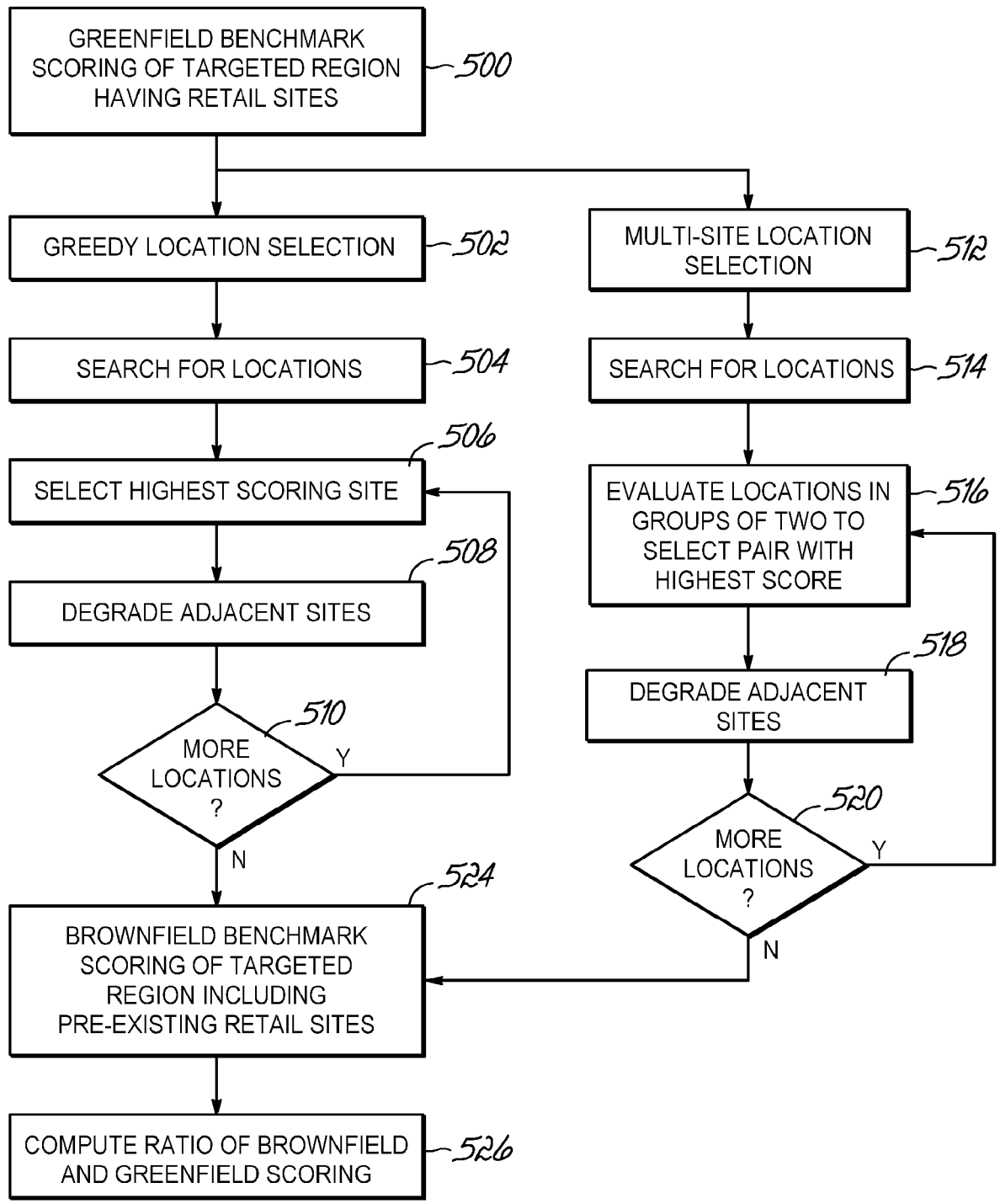
FIG. 5 illustrates a greenfield and brownfield benchmarking process using the geographic data developed in accordance with principles of the present invention.

Referring now to FIG. 5, after development of a geospatial database according to the noted process, a benchmarking process in accordance with the present invention proceeds according to the following sequence of steps:

An initial, greenfield algorithm 500 is used for developing a benchmark score for a targeted region having a number of pre-existing retail sites. This is performed using a so-called "greedy" location selection method 502 and a multi-site location method 512, which produce comparable strategies for later evaluation.

In the greedy location selection method 502, the processor searches 504 for locations within the target region with sufficiently high scores to be profitable, and eligible for a retail site (appropriate zoning). Next, in step 506 the highest scoring location of those meeting the criteria of step 504 is selected. Thereafter, in step 508 the processor degrades the scoring of sites surrounding the chosen location based on their adjacency (e.g., driving time) to the site chosen in step 506. Thereafter, steps 506 and 508 are repeated until the targeted number of sites have been identified in the targeted region.

In the greenfield algorithm for developing a benchmark score for a targeted region, multi-site location selection version 512, the processor searches 514 for locations within the target region with sufficiently high scores to be profitable, and eligible for a retail site (appropriate zoning). Next, in step 516 the processor evaluates groups of two or more locations meeting the criteria of step 514 to identify a group of locations having the highest combined score when the scores of each location are degraded based upon adjacency (e.g., driving time) to the other locations in the group. A group of locations is selected if their combined score is higher than the combined scores of an equal number of locations placed according to the greedy version 502 of the algorithm. After selection of groups through the preceding steps, the processor degrades the scoring of sites surrounding the chosen locations based on their adjacency (e.g., driving time) to the sites chosen in step 516. Thereafter, steps 516 and 518 are repeated until the targeted number of sites have been identified in the targeted region.

After the foregoing process of greenfield scoring of possible sites in a given target region, in step 524 a brownfield scoring is performed for the targeted region and the pre-existing retail sites, which involves identifying the highest scoring pre-existing retail site, degrading the scoring of pre-existing sites surrounding the selected pre-existing site based on their adjacency (e.g. driving time) to the chosen site chosen in step, and then repeating these steps until all pre-existing retail sites have been identified and scored.

To determine the overall health of an existing retail site network, the greenfield and brownfield scores are compared. Specifically, in step 526 the processor computes the ratio of the brownfield score from step 524 to the greenfield score compiled by the preceding steps to create a percentage measure of the existing network health.

After thus computing a network score, then multiple further analytical steps may be performed.

For example, a computation of remaining capacity in a targeted region may proceed by applying the greenfield algorithms of 502 or 512 to the region after degrading all location scores based on adjacency (e.g. driving time) to the pre-existing retail sites. Additional locations may then be selected according to the greenfield algorithm of 502 or 512 until any remaining available locations have insufficient scores for profitability. This can provide a measure of whether a targeted region has been saturated with retail locations, and, if not, where additional retail locations can be ideally located.

Further, an evaluation of locations may identify the potential gains available from closing or relocating a retail location, by performing brownfield evaluations (step 524) on existing locations without the location to be closed or relocated, and comparing the results to the brownfield evaluation with that location present. Identification of a site for a new location can proceed by performing a greenfield analysis to identify the optimal location.

In those industries where the activities of consumers can be well characterized, such as in banking or retail lines with robust loyalty programs, the choices of locations to be closed or relocated can be even more informed, by identifying those locations which are linked to each other by common customers. Locations may be related to just one other location, or locations may be linked to a group of other locations via a ring or hub-spoke relationship, and locations may be isolated in the sense of not having many common customers with other locations. Applying data to identify these scenarios permits a more refined decision process in closing or relocating retail locations. For example, one location of a closely linked pair of locations may be closed with less loss of customers than would be otherwise predicted, and the most tightly connected spoke location of a group of locations in a hub-and-spoke relationship can likely be closed with less loss of customers than would be otherwise predicted. Locations which are isolated present a concern for loss of customers likely to exceed what would be otherwise predicted, and thus can be considered candidates to be retained, or sold to another retail entity, rather than closed, to avoid loss of value.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for spatially relative apportionment of geospatial data in a distributed computing system, the method comprising:
   obtaining a tile attribute data set for a plurality of tiles corresponding to a geographical region, wherein each of the tiles corresponds to a respective sub-region of the geographical region, wherein the tile attribute data set comprises a plurality of tile attribute records, and wherein each of the tile attribute records (i) identifies a respective tile included in the plurality of tiles and (ii) indicates respective values of a plurality of attributes of the sub-region corresponding to the respective tile;
   obtaining a spatial relationship data set for the plurality of tiles, wherein the spatial relationship data set comprises a plurality of spatial relationship records, and wherein each of the spatial relationship records (i) identifies a respective pair of tiles included in the plurality of tiles and (ii) indicates a spatial relationship between the respective pair of tiles;
   storing the tile attribute data set and the spatial relationship data set in one or more storage devices of the distributed computing system;
   with a plurality of processing devices of the distributed computing system, performing spatially relative apportionment of the tile attribute data set based on the spatial relationship data set, wherein performing the spatially relative apportionment includes, for each tile T in the plurality of tiles and each spatial relationship R in a plurality of spatial relationships,
      identifying, based on the spatial relationship data set, a subset of the plurality of tiles having the respective spatial relationship R to the respective tile T,
      for each attribute in the plurality of attributes, aggregating the values of the respective attribute indicated by the subset of tiles, thereby generating an aggregated attribute value for the respective attribute,
      generating a record of spatially relative apportionment (i) identifying the respective tile T and the respective spatial relationship R and (ii) indicating the aggregated attribute values of the subset of tiles having the respective spatial relationship R to the respective tile T, and
      storing the record of spatially relative apportionment in a spatially apportioned data set indexed by tile identifier; and
   obtaining the spatially apportioned data set from the distributed computing system.

2. The method of claim 1, wherein the spatial relationship data set is obtained prior to the performing of the spatially relative apportionment.

3. The method of claim 1, further comprising:
   generating a second tile attribute data set for the plurality of tiles;
   storing the second tile attribute data set and the spatial relationship data set in one or more storage devices of the distributed computing system; and
   with a plurality of processing devices of the distributed computing system, performing spatially relative apportionment of the second tile attribute data set based on the spatial relationship data set.

4. The method of claim 1, further comprising assessing a quality of a set of physical locations of sites of a type of activity within a portion of the geographical region corresponding to a subset of the plurality of tiles.

5. The method of claim 4, wherein assessing the quality of the set of physical locations comprises:
   identifying, within the spatially apportioned data set, the records of spatially relative apportionment identifying the subset of tiles corresponding to the portion of the geographical region;
   determining a greenfield benchmark score for the portion of the geographical region based on one or more potential locations of sites of the type of activity within the geographical region and the identified records of spatially relative apportionment;

determining a brownfield score for the portion of the geographical region based on one or more current physical locations of sites of the type of activity within the geographical region and the identified records of spatially relative apportionment; and determining a quality score based on the brownfield score and the greenfield benchmark score.

6. The method of claim 5, wherein determining the quality score comprises determining a ratio of the brownfield score to the greenfield benchmark score.

7. The method of claim 5, further comprising assessing an impact of adding a new site of the type of activity at a particular location within the portion of the geographical region, comprising:

determining an updated brownfield score for the portion of the geographical region based on the one or more current physical locations of sites of the type of activity, the particular location of the new site, and the identified records of spatially relative apportionment.

8. The method of claim 5, further comprising assessing an impact of terminating the type of activity at a particular one of the current physical locations of sites of the type of activity, comprising:

determining an updated brownfield score for the portion of the geographical region based on (i) a set of physical locations consisting of the one or more current physical locations of sites of the type of activity other than the particular current physical location and (ii) the identified records of spatially relative apportionment.

9. The method of claim 1, further comprising selecting the plurality of tiles from a larger set of tiles corresponding to the geographical region, comprising:

selecting, from the larger set of tiles, one or more first tiles accessible via a street network, wherein each of the one or more first tiles intersects a street in the street network;

selecting, from the larger set of tiles, one or more second tiles adjacent to the street network, wherein each of the one or more second tiles borders at least one of the first tiles; and including the one or more first tiles and the one or more second tiles in the plurality of tiles.

10. The method of claim 9, wherein selecting the plurality of tiles further comprises:

selecting, from the larger set of tiles, one or more tiles proximate to a governmental boundary; and including the one or more tiles proximate to the governmental boundary in the plurality of tiles.

11. The method of claim 1, wherein obtaining the spatial relationship data set for the plurality of tiles comprises generating the spatial relationship data set.

12. The method of claim 11, wherein generating the spatial relationship data set comprises:

selecting a plurality of pairs of tiles, wherein each tile in each of the selected pairs of tiles is included in the plurality of tiles; and for each selected pair of tiles, determining a spatial relationship between central features of the respective pair of tiles.

13. The method of claim 12, wherein the central features of the pairs of tiles comprise centroids of the pairs of tiles.

14. A system comprising:

one or more processing devices and one or more storage devices storing instructions, the processing device being operable to execute the instructions to perform operations including:

obtaining a tile attribute data set for a plurality of tiles corresponding to a geographical region, wherein each of the tiles corresponds to a respective sub-region of the geographical region, wherein the tile attribute data set comprises a plurality of tile attribute records, and wherein each of the tile attribute records (i) identifies a respective tile included in the plurality of tiles and (ii) indicates respective values of a plurality of attributes of the sub-region corresponding to the respective tile;

obtaining a spatial relationship data set for the plurality of tiles, wherein the spatial relationship data set comprises a plurality of spatial relationship records, and wherein each of the spatial relationship records (i) identifies a respective pair of tiles included in the plurality of tiles and (ii) indicates a spatial relationship between the respective pair of tiles;

storing the tile attribute data set and the spatial relationship data set in one or more storage devices of a distributed computing system, the distributed computing system including a plurality of processing devices configured to perform spatially relative apportionment of the tile attribute data set based on the spatial relationship data set, wherein performing the spatially relative apportionment includes, for each tile T in the plurality of tiles and each spatial relationship R in a plurality of spatial relationships, identifying, based on the spatial relationship data set, a subset of the plurality of tiles having the respective spatial relationship R to the respective tile T, for each attribute in the plurality of attributes, aggregating the values of the respective attribute indicated by the subset of tiles, thereby generating an aggregated attribute value for the respective attribute, generating a record of spatially relative apportionment (i) identifying the respective tile T and the respective spatial relationship R and (ii) indicating the aggregated attribute values of the subset of tiles having the respective spatial relationship R to the respective tile T, and storing the record of spatially relative apportionment in a spatially apportioned data set indexed by tile identifier; and obtaining the spatially apportioned data set from the distributed computing system.

15. The system of claim 14, wherein the spatial relationship data set is obtained prior to the performing of the spatially relative apportionment.

16. The system of claim 14, wherein the operations further include:

generating a second tile attribute data set for the plurality of tiles; and storing the second tile attribute data set and the spatial relationship data set in one or more storage devices of the distributed computing system, the plurality of processing devices of the distributed computing system being configured to perform spatially relative apportionment of the second tile attribute data set based on the spatial relationship data set.

17. The system of claim 14, wherein the operations further include assessing a quality of a set of physical locations of sites of a type of activity within a portion of the geographical region corresponding to a subset of the plurality of tiles.

18. The system of claim 17, wherein assessing the quality of the set of physical locations comprises:
identifying, within the spatially apportioned data set, the records of spatially relative apportionment identifying the subset of tiles corresponding to the portion of the geographical region;
determining a greenfield benchmark score for the portion of the geographical region based on one or more potential locations of sites of the type of activity within the geographical region and the identified records of spatially relative apportionment;
determining a brownfield score for the portion of the geographical region based on one or more current physical locations of sites of the type of activity within the geographical region and the identified records of spatially relative apportionment; and
determining a quality score based on the brownfield score and the greenfield benchmark score.

19. The system of claim 18, wherein determining the quality score comprises determining a ratio of the brownfield score to the greenfield benchmark score.

20. The system of claim 18, wherein the operations further include assessing an impact of adding a new site of the type of activity at a particular location within the portion of the geographical region, comprising:
determining an updated brownfield score for the portion of the geographical region based on the one or more current physical locations of sites of the type of activity, the particular location of the new site, and the identified records of spatially relative apportionment.

21. The system of claim 18, wherein the operations further include assessing an impact of terminating the type of activity at a particular one of the current physical locations of sites of the type of activity, comprising:
determining an updated brownfield score for the portion of the geographical region based on (i) a set of physical locations consisting of the one or more current physical locations of sites of the type of activity other than the particular current physical location and (ii) the identified records of spatially relative apportionment.

22. The system of claim 14, wherein the operations further include selecting the plurality of tiles from a larger set of tiles corresponding to the geographical region, comprising:
selecting, from the larger set of tiles, one or more first tiles accessible via a street network, wherein each of the one or more first tiles intersects a street in the street network;
selecting, from the larger set of tiles, one or more second tiles adjacent to the street network, wherein each of the one or more second tiles borders at least one of the first tiles; and
including the one or more first tiles and the one or more second tiles in the plurality of tiles.

23. The system of claim 22, wherein selecting the plurality of tiles further comprises:
selecting, from the larger set of tiles, one or more tiles proximate to a governmental boundary; and
including the one or more tiles proximate to the governmental boundary in the plurality of tiles.

24. The system of claim 14, wherein obtaining the spatial relationship data set for the plurality of tiles comprises generating the spatial relationship data set.

25. The system of claim 24, wherein generating the spatial relationship data set comprises:
selecting a plurality of pairs of tiles, wherein each tile in each of the selected pairs of tiles is included in the plurality of tiles; and
for each selected pair of tiles, determining a spatial relationship between central features of the respective pair of tiles.

26. The system of claim 25, wherein the central features of the pairs of tiles comprise centroids of the pairs of tiles.

27. A distributed computing system comprising:
a plurality of processing devices and one or more storage devices storing instructions, the processing devices being operable to execute the instructions to perform operations including:
obtaining a tile attribute data set for a plurality of tiles corresponding to a geographical region, wherein each of the tiles corresponds to a respective sub-region of the geographical region, wherein the tile attribute data set comprises a plurality of tile attribute records, and wherein each of the tile attribute records (i) identifies a respective tile included in the plurality of tiles and (ii) indicates respective values of a plurality of attributes of the sub-region corresponding to the respective tile;
obtaining a spatial relationship data set for the plurality of tiles, wherein the spatial relationship data set comprises a plurality of spatial relationship records, and wherein each of the spatial relationship records (i) identifies a respective pair of tiles included in the plurality of tiles and (ii) indicates a spatial relationship between the respective pair of tiles;
storing the tile attribute data set and the spatial relationship data set in one or more storage devices;
performing spatially relative apportionment of the tile attribute data set based on the spatial relationship data set, wherein performing the spatially relative apportionment includes, for each tile T in the plurality of tiles and each spatial relationship R in a plurality of spatial relationships,
identifying, based on the spatial relationship data set, a subset of the plurality of tiles having the respective spatial relationship R to the respective tile T,
for each attribute in the plurality of attributes, aggregating the values of the respective attribute indicated by the subset of tiles, thereby generating an aggregated attribute value for the respective attribute,
generating a record of spatially relative apportionment (i) identifying the respective tile T and the respective spatial relationship R and (ii) indicating the aggregated attribute values of the subset of tiles having the respective spatial relationship R to the respective tile T, and
storing the record of spatially relative apportionment in a spatially apportioned data set indexed by tile identifier; and
providing the spatially apportioned data set to a remote computing device.

* * * * *